US012574185B2

(12) United States Patent (10) Patent No.: US 12,574,185 B2
Desai et al. (45) Date of Patent: Mar. 10, 2026

(54) DYNAMIC FILTERING OF DUAL ACCESS POINTS

(71) Applicant: Cisco Technology, Inc., San Jose, CA (US)

(72) Inventors: Vishal S. Desai, San Jose, CA (US); Peiman Amini, Fremont, CA (US); Ardalan Alizadeh, Milpitas, CA (US); Fred J. Anderson, Lakeville, OH (US); Bahador Amiri, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 18/176,318

(22) Filed: Feb. 28, 2023

(65) Prior Publication Data

US 2024/0291616 A1     Aug. 29, 2024

(51) Int. Cl.
*H04L 5/00* (2006.01)
*H04L 25/02* (2006.01)
*H04W 72/0453* (2023.01)

(52) U.S. Cl.
CPC .......... *H04L 5/0053* (2013.01); *H04L 5/0073* (2013.01); *H04L 25/0212* (2013.01); *H04W 72/0453* (2013.01)

(58) Field of Classification Search
CPC ............. H04W 72/0453; H04L 5/0053; H04L 5/0073; H04L 25/0212
See application file for complete search history.

(56) References Cited

U.S. PATENT DOCUMENTS

| | | | |
|---|---|---|---|
| 12,284,560 B2 * | 4/2025 | Kneckt ............. | H04W 72/0453 |
| 2014/0156197 A1 * | 6/2014 | Kim ..................... | A61B 5/7207 |
| | | | 702/19 |
| 2016/0081092 A1 * | 3/2016 | Akhavan-Saraf ... | H04W 72/541 |
| | | | 370/329 |
| 2017/0325158 A1 | 11/2017 | Phogat et al. | |
| 2018/0249445 A1 | 8/2018 | Gallagher et al. | |
| 2019/0037418 A1 | 1/2019 | Gunasekara et al. | |
| 2021/0258804 A1 * | 8/2021 | Amini ............... | H04W 52/0206 |
| 2021/0377947 A1 * | 12/2021 | Changlani .............. | H04L 5/001 |
| 2021/0409957 A1 | 12/2021 | Changlani et al. | |
| 2022/0418022 A1 * | 12/2022 | Kneckt ................. | H04W 36/06 |
| 2023/0413189 A1 * | 12/2023 | Wang ................ | H04W 72/0453 |

(Continued)

OTHER PUBLICATIONS

Jerry Jongerius, "Wi-Fi 4/5/6/6E (802.11 n/ac/ax) Make educated wireless router/AP upgrade decisions," Duckware, Version 8.3a, dated: Sep. 25, 2022, pp. 1-73.

(Continued)

*Primary Examiner* — Jeong S Park
(74) *Attorney, Agent, or Firm* — Patterson + Sheridan, LLP

(57) ABSTRACT

Techniques for dynamically selecting filter parameters for a multi-radio multi-band configuration are described. An example technique includes determining a device class associated with a computing device comprising a plurality of radios operating on a plurality of bands. One or more target operating parameters of the computing device are determined based at least in part on the device class. One or more filter parameters of a plurality of filters for operating the plurality of radios are determined based at least in part on the one or more target operating parameters. The plurality of radios are configured according to the one or more filter parameters.

20 Claims, 5 Drawing Sheets

(56)                 References Cited

U.S. PATENT DOCUMENTS

2024/0267941 A1*   8/2024   Kulkarni ........... H04W 72/0453
2024/0389085 A1*  11/2024   Peruga Nasarre .. H04L 27/2646

OTHER PUBLICATIONS

Author Unkown, "Akoustis Enables Ultra Tri-band Filtering for New Line of Aruba Wi-Fi 6E Products," Globe Newswire, Dated: Jun. 2, 2022, pp. 1-4.

* cited by examiner

| DEVICE CLASS | OPERATING BANDS | MAXIMUM EIRP | MAXIMUM EIRP POWER SPECTRAL DENSITY |
|---|---|---|---|
| STANDARD-POWER ACCESS POINT (AFC CONTROLLED) | U-NII-5 (5.925-6.425 GHz) U-NII-7 (6.525-6.875 GHz) | 36 dBM | 23 dBM/MHz |
| FIXED CLIENT (AFC CONTROLLED) | | 36 dBM | 23 dBM/MHz |
| CLIENT CONNECTED TO STANDARD-POWER ACCESS POINT | | 36 dBM | 17 dBM/MHz |
| LOW-POWER ACCESS POINT (INDOOR ONLY) | U-NII-5 (5.925-6.425 GHz) U-NII-6 (6.425-6.525 GHz) U-NII-7 (6.525-6.875 GHz) U-NII-8 (6.875-7.125 GHz) | 30 dBM | 5 dBM/MHz |
| CLIENT CONNECTED TO LOW-POWER ACCESS POINT | | 24 dBM | -1 dBM/MHz |

*Fig. 3*

DYNAMIC FILTERING OF DUAL ACCESS POINTS

TECHNICAL FIELD

Embodiments presented in this disclosure generally relate to wireless communications. More specifically, embodiments disclosed herein relate to dynamic filtering of multiple access points communicating within a frequency band.

BACKGROUND

Recently, the Federal Communications Commission (FCC) has opened spectrum in the 6 gigahertz (GHz) band for unlicensed use, expanding the use of wireless technologies, such as Wi-Fi or 802.11, into the 6 GHz band and opening additional spectrum for wireless communications. This untapped spectrum offers additional channels for bandwidth-intensive applications. To efficiently utilize the new spectrum, certain wireless devices may have a multi-radio configuration, in which multiple radios operate in the same frequency band. For example, certain wireless devices may have a dual radio configuration, in which dual radios operate in the same frequency band, such as the 6 GHz band or 5 GHz band. For concurrent transmission and reception in both radios, the radios can be separated in frequency domain using passband filters in the front-end. However, using such a multi-radio configuration can present challenges when operating in certain frequency bands, such as the 6 GHz band.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 is a table illustrating an example of unlicensed use of the 6 GHz band for different device classes.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment described herein includes a computer-implemented method. The computer-implemented method includes determining a device class associated with a computing device comprising a plurality of radios operating on a plurality of bands. The computer-implemented method also includes determining one or more target operating parameters of the computing device, based at least in part on the device class. The computer-implemented method further includes determining one or more filter parameters of a plurality of filters for operating the plurality of radios, based at least in part on the one or more target operating parameters. The computer-implemented method further includes configuring the plurality of radios according to the one or more filter parameters.

Another embodiment described herein includes a computing device. The computing device includes a plurality of radios operating on a plurality of bands, a memory and a processor communicatively coupled to the memory. The processor is configured to perform an operation. The operation includes determining a device class associated with the computing device. The operation also includes determining one or more target operating parameters of the computing device, based at least in part on the device class. The operation further includes determining one or more filter parameters of a plurality of filters for operating the plurality of radios, based at least in part on the one or more target operating parameters. The operation further includes configuring the plurality of radios according to the one or more filter parameters.

Another embodiment presented in this disclosure provides a computer-readable storage medium. The computer-readable storage medium includes computer executable code, which when executed by one or more processors, performs an operation. The operation includes determining a device class associated with the computing device comprising a plurality of radios operating on a plurality of bands. The operation also includes determining one or more target operating parameters of the computing device, based at least in part on the device class. The operation further includes determining one or more filter parameters of a plurality of filters for operating the plurality of radios, based at least in part on the one or more target operating parameters. The operation further includes configuring the plurality of radios according to the one or more filter parameters.

Example Embodiments

Figure 1:
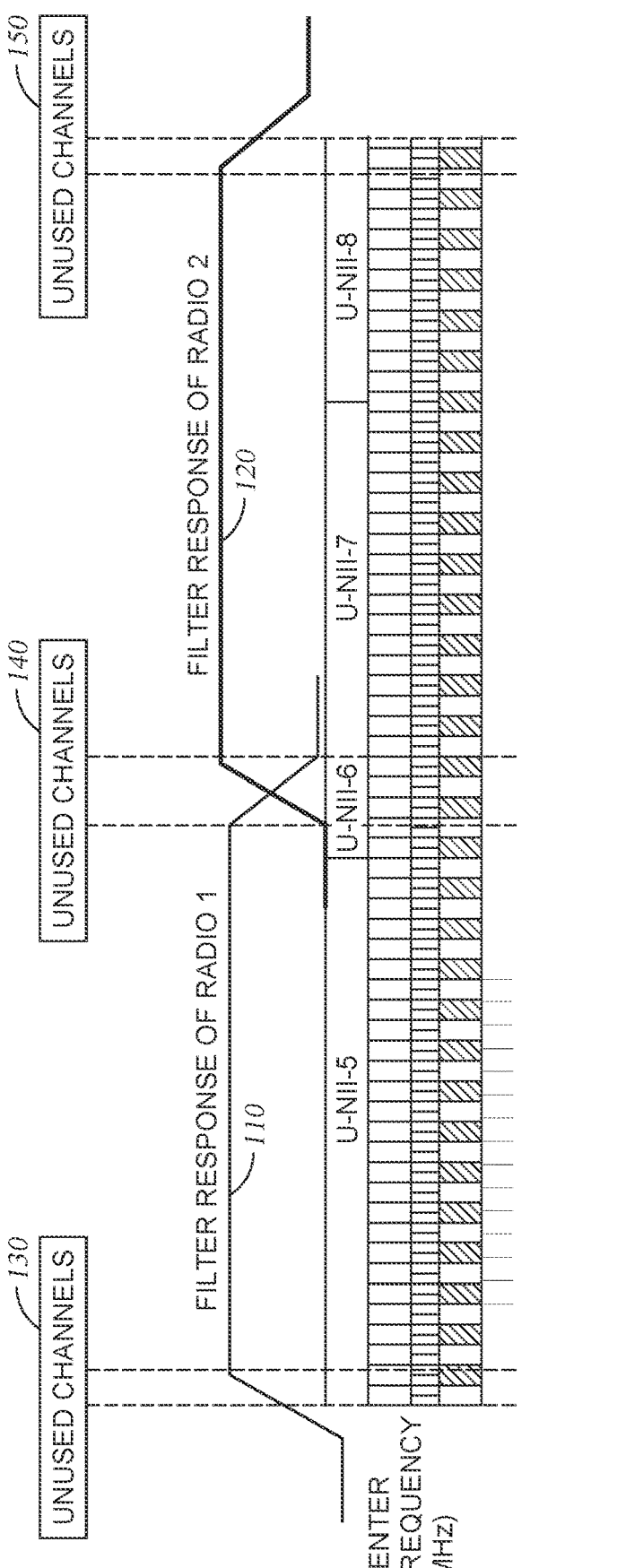
FIG. 1 illustrates an example filter design for a dual-radio configuration of a wireless device.

Certain multi-radio configurations may present challenges when operating in certain frequency bands, such as the 6 GHz band. For example, current multi-radio configurations may utilize an additional radio operating in the same frequency band. To provide independent/concurrent usage of two radios in the same frequency band, the entire band may be split into two non-overlapped sub-bands. An example of a static filter design for such a dual radio configuration is shown in FIG. 1. Here, the filter design 100 allows two radios to operate in different sub-bands of the 6 GHz band, where the radios are separated in the frequency domain using bandpass filters in the front-end. As shown in FIG. 1, the entire 6 GHz band (e.g., Unlicensed National Information Infrastructure (UNII)-5 through UNII-8) is split into two non-overlapped sub-bands isolated by strong radio frequency (RF) filtering in the front-end.

In practice, however, it is significantly challenging to have ideal sharp bandpass filters to separate two sub-bands on exact boundaries of the 20 megahertz (MHZ) channels. Instead, due to the roll-off factor of conventional filters used in dual-radio configurations, multiple 20 MHz channels (of the 6 GHz band) may be placed in the transition band of both filters, making a large number of channels unused when both radios are enabled. As shown in FIG. 1, for example, due to the filter response 110 of radio 1 and the filter response 120 of radio 2, the set of channels 130, 140, and 150 are unusable. Due to the large roll-off factor, it is not possible with static filter designs to avoid such channel removals from the edges of the sub-bands per radio.

To address this, embodiments described herein provide techniques for dynamically selecting filter parameters (e.g., center frequency, bandwidth, roll-off, and similar parameters) for filters used in a multi-radio configuration, such that the number of available channels are maximized per use case and deployment scenario. As described below, embodiments described herein allow for dynamically changing the filter characteristics to optimize several aspects of a wireless device's functionalities, such as the number of supported channels per radio and automated frequency coordination (AFC)-related flexibilities.

In certain embodiments, a computing device employs at least one of (i) one or more configurable filters or (ii) one or more filter banks to dynamically change the location of unavailable channels based on the usages. The computing device can determine the optimal set of frequencies that can be masked based on the filter response and capabilities of the radios. The computing device can determine the center frequencies and bandwidth based on various criteria/information, including, but not limited to, computing device's capabilities, station load, Q-factor, and operational transmit (Tx) power budget.

Note, the techniques described herein for dynamically selecting filter parameters for filters used in a multi-radio configuration of a computing device may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include an AP or a network controller.

Figure 2:
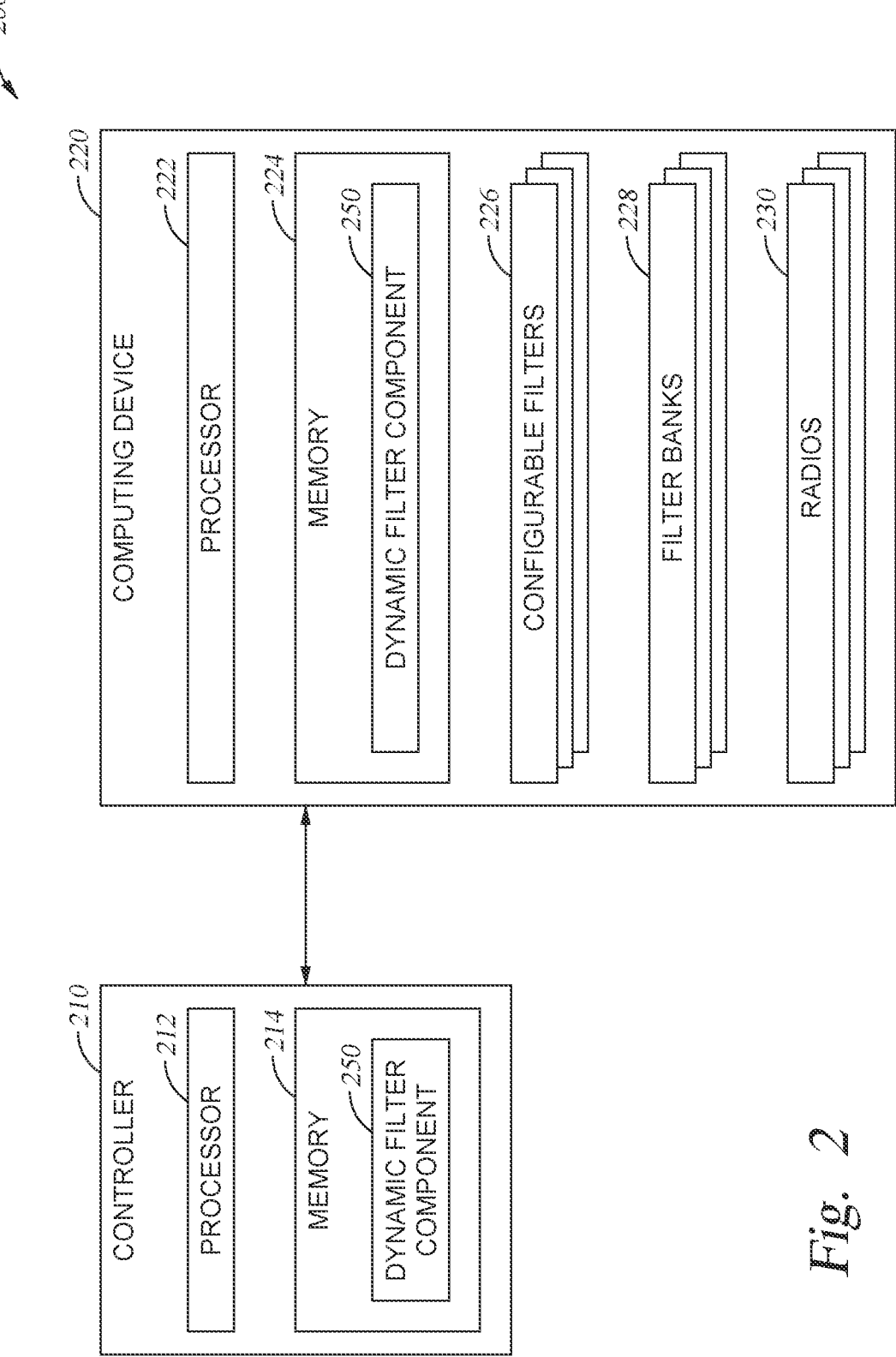
FIG. 2 illustrates an example system, according to one embodiment.

FIG. 2 illustrates an example system 200 in which one or more techniques described herein can be implemented, according to one embodiment. The system 200 includes a controller 210 and a computing device 220. The controller 210 and the computing device 220 are communicatively coupled to each other via a wired or wireless network. The computing device 220 is any suitable device for communicating with components of the system 200. As an example and not by way of limitation, the computing device 220 may be an access point (AP) or a client station (STA). An AP is generally a fixed station that communicates with client STA(s) and may also be referred to as a base station, wireless device, or some other terminology. A client STA may be fixed or mobile and also may be referred to as a mobile STA, a client, a STA, a wireless device, or some other terminology. Note that while a single computing device 220 is depicted, the system 200 can include any number of computing devices 220.

The controller 210 couples to and provides coordination and control for the computing device 220. For example, the controller 210 may handle adjustments to radio frequency power, channels, authentication, and security for the computing device 220. In one embodiment, the controller 210 may coordinate or control or configure the radio configuration within the computing device 220.

As shown, the computing device 220 includes a processor 222, a memory 224, one or more configurable filters 226, one or more filter banks 228, and one or more radios 230. The processor 222 is any electronic circuitry, including, but not limited to one or a combination of microprocessors, microcontrollers, application specific integrated circuits (ASIC), application specific instruction set processor (ASIP), and/or state machines, that communicatively couples to memory 224 and controls the operation of the computing device 220. The processor 222 may be 8-bit, 16-bit, 32-bit, 64-bit or of any other suitable architecture. The processor 222 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 222 may include other hardware that operates software to control and process information. The processor 222 executes software stored on the memory 224 to perform any of the functions described herein. The processor 222 controls the operation and administration of the computing device 220 by processing information (e.g., information received from the controller 210 and/or memory 224). The processor 222 is not limited to a single processing device and may encompass multiple processing devices.

The memory 224 may store, either permanently or temporarily, data, operational software, or other information for the processor 222. The memory 224 may include any one or a combination of volatile or non-volatile local or remote devices suitable for storing information. For example, the memory 224 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 224, a disk, a CD, or a flash drive. In particular embodiments, the software may include an application executable by the processor 222 to perform one or more of the functions described herein. Here, the memory 224 includes a dynamic filter component 250, which is configured to perform one or more techniques described herein for dynamically selecting filter parameters for filters used in a multi-radio configuration of the computing device 220. Note, the dynamic filter component 250 is described in greater detail below.

The computing device 220 uses one or more of the radios 230 to form connections with other devices in the system 200. For example, the computing device 220 may use a radio 230 to form a first wireless link with a first device and use another radio to form a second wireless link with a second device. The radios 230 may be configured to operate on different sub-bands within the same frequency band (e.g., 6 GHZ band, 5 GHz band, etc.).

The computing device 220 is capable of multiple different multi-radio configurations. For example, the computing device 220 may use one or more of the configurable filters 226 and/or one or more of the filter banks 228 to enable a particular multi-radio configuration. Each multi-radio configuration may be based on different filter parameters, such that the location and/or number of unavailable channels within the operating frequency band is different.

The controller 210 includes a processor 212 and a memory 214. The processor 212 is any electronic circuitry, including, but not limited to one or a combination of microprocessors, microcontrollers, application specific integrated circuits (ASIC), application specific instruction set processor (ASIP), and/or state machines, that communicatively couples to memory 214 and controls the operation of the controller 210. The processor 212 may be 8-bit, 16-bit, 32-bit, 64-bit or of any other suitable architecture. The processor 212 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 212 may include other hardware that operates software to control and process information. The processor 212 executes software stored on the memory 214 to perform any of the functions described herein. The processor 212 controls the operation and administration of the controller 210 by processing information (e.g., information received from the computing device 220 and/or memory 214). The processor 212 is not limited to a single processing device and may encompass multiple processing devices.

The memory 214 may store, either permanently or temporarily, data, operational software, or other information for the processor 212. The memory 214 may include any one or a combination of volatile or non-volatile local or remote devices suitable for storing information. For example, the memory 214 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 214, a disk, a CD, or a flash drive. In particular embodiments, the software may include an application executable by the processor 212 to perform one or more of the functions described herein. In one embodiment, the memory 214 includes a dynamic filter component 250, which is configured to perform one or more techniques described herein for dynamically selecting filter parameters for filters used in a multi-radio configuration of the computing device 220.

In some embodiments, the dynamic filter component 250 performs dynamic selecting of filter parameters based on capabilities of the computing device (e.g., access point capabilities), station load, Q factor, operational transmit power budget and other criteria. In one embodiment, the computing device's capabilities may include whether the computing device 220 is capable of standard power operation or indoor low power operation.

For example, in general, two different types of unlicensed operations are allowed in the 6 GHz band: standard power (SP) and indoor low power (also referred to as low-power indoor (LPI) operations). SP operations, which encompass SP APs and fixed client devices, are permitted in the 5.925-6.425 GHz portion and 6.525-6.875 portion of the 6 GHz band and operate under the control of an AFC system to prevent harmful interference to microwave links that operated in the band. Such an AFC system may maintain a list of frequencies used by incumbent systems in the geographical location of the AP. The AFC system may assign a list of frequencies to the AP, based on where it can operate safely without interfering with any incumbent. In certain embodiments, the AFC system may be located within or communicatively coupled to the controller 210 depicted in FIG. 2.

In addition to SP APs, LPI APs (5 dBm/MHz) and clients (−1 dBm/MHz) can operate throughout the 6 GHz bands without contacting the AFC system as long as these devices are confined to indoor environments. Due to building entry losses, (the median value of 20.25 dB) LPI devices are permitted to operate within the exclusion zones of incumbent users. An example of expanded unlicensed use of the 6 GHz band for different device classes, including SP devices and LPI devices, is depicted in FIG. 3.

Certain computing devices, such as 6 GHZ APs can operate on different power budgets based on their hardware capabilities and model information. For example, an indoor AP with an integrated antenna can support LPI by default. Similarly, outdoor APs and radios with external antennas generally have to operate at standard power. These classes of APs generally have to comply with local government regulatory constraints. For example, all SP radios in the United States have to comply with an AFC system that determines the radio's power budget and set of allowed frequencies based on the FCC unlicensed spectrum incumbent information. Furthermore, indoor APs with integrated antenna(s) can also operate at standard power as long as their radio's FEM can support higher effective isotropic radiated power (EiRP) budgets. In embodiments described herein, the dynamic filter component 250 can leverage the above information to determine a filter's center frequencies.

Figure 4:
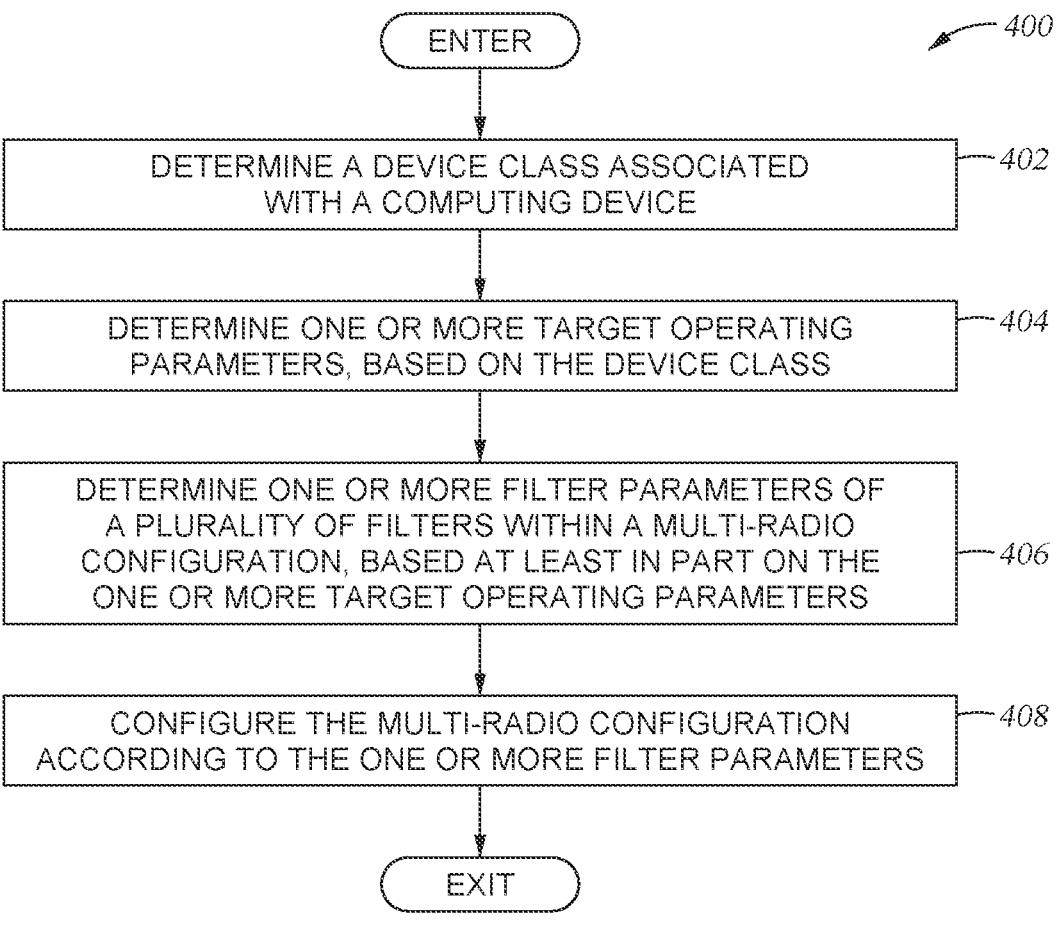
FIG. 4 is a flowchart of an example method for dynamic filter selection, according to one embodiment.

FIG. 4 illustrates a flowchart of an example method 400 for performing dynamic filter selection for a multi-radio configuration, according to one embodiment. The method 400 may be performed by a dynamic filter component (e.g., dynamic filter component 250).

Method 400 enters at block 402, where the dynamic filter component determines a device class associated with a computing device (e.g., computing device 220). In one embodiment, the computing device is an AP. In such an embodiment, the device class may be one of the following types: LPI only, SP only, and LPI and SP capable.

At block 404, the dynamic filter component determines one or more target operating parameters, based on the device class. For example, LPI only APs may use the full 1200 MHz of spectrum (within the 6 GHz band) for operation. Accordingly, the dynamic filter component may assess the channel quality index on each preferred scanning channel (PSC) and evaluate the interference profile on both Wi-Fi and non-WiFi interferers when determining the target operating parameters for LPI only APs.

On the other hand, for APs that are SP only and LPI and SP capable, the dynamic filter component may determine the target operating parameters, based at least in part on information from an AFC system.

At block 406, the dynamic filter component determines one or more filter parameters of a plurality of filters within a multi-radio configuration for the computing device, based at least in part on the target operating parameters.

At block 408, the dynamic filter component configures the multi-radio configuration according to the one or more filter parameters.

Figure 5:
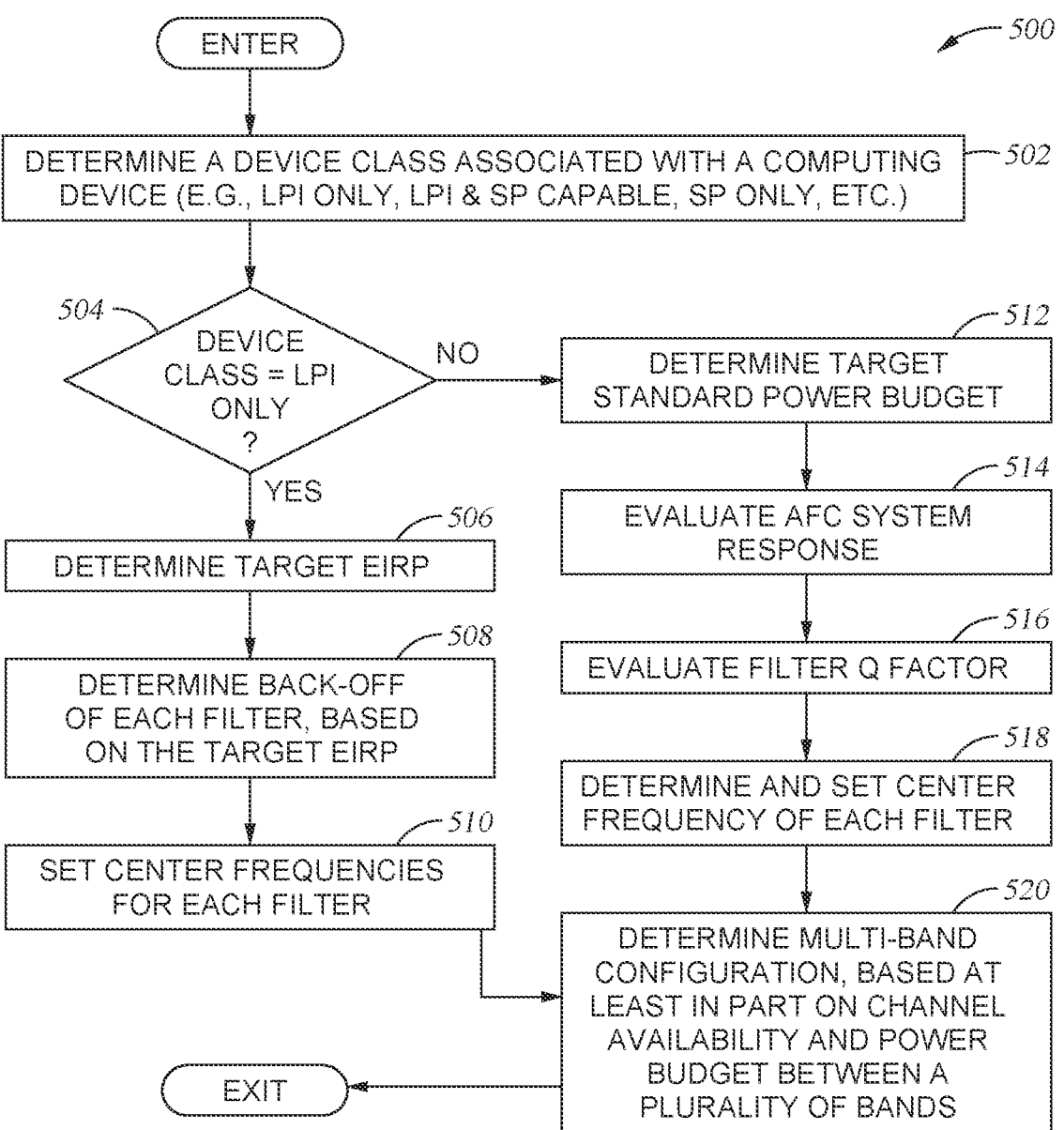
FIG. 5 is a flowchart of an example method for dynamic filter selection, according to one embodiment.

FIG. 5 illustrates a flowchart of an example method 500 for performing dynamic filter selection for a multi-radio configuration, according to one embodiment. The method 500 may be performed by a dynamic filter component (e.g., dynamic filter component 250).

Method 500 enters at block 502, where the dynamic filter component determines a device class associated with a computing device (e.g., LPI only, SP only, LPI and SP capable, etc.). At block 504, the dynamic filter component determines if the device class is LPI only. If so, then the method 500 proceeds to block 506, where the dynamic filter component determines a target EiRP for the device class. For example, the dynamic filter component may determine the target EiRP on the localized RF neighborhood, based on the AP's density and station load.

Note that, because the United States allows dynamic EiRP (with fixed power spectral density (PSD)) over higher bandwidths, the total power may vary based on the operational bandwidth as well. Thus, in one embodiment, based on the RF proximity between the radios and station load, the dynamic filter component can choose the operational bandwidth for all the radios in the neighborhood. In another embodiment, the dynamic filter component can determine power budget information from radio resource management (RRM) Transmit Power Control algorithm output.

At block 508, the dynamic filter component determines back-off of each filter, based in part on the target EiRP. For example, from the target EiRP (or more generally target power budget, the dynamic filter component can calculate the necessary backoff on the sides of the band-pass filter(s). In some scenarios, cell operation at the EiRP budgets may be associated with more backoff than lower powers even within LPI range. The EiRP budget can vary between 18 dBm to 27 dBm based on the bandwidth between 20 MHz and 160 MHz. For Wi-Fi 7 radios operating at 320 MHz, this would allow for 30 dBm of EiRP budget and therefore would lead to higher backoff for the band-pass filters.

At block 510, the dynamic filter component sets the center frequencies for each filter, based in part on the operations performed in block 506 and block 508. For example, given the RF density between 6 GHz radios and their station load, if a localized neighborhood would benefit from having dual 6 GHz radios, then the dynamic filter component may chooses a center frequency to allow for dual band enablement. In one embodiment, the dynamic filter component chooses a contiguous set of PSCs & their extended channels having the lowest metrics as used-channels for enabling dual band operations. In another embodiment, in the event where contiguous set of PSCs are not available or the station load does not rely on multiple radios, then the dynamic filter component can continue with single-band radios and put the passband at the edge of 5 GHz and 6 GHz spectrum.

Referring back to block 504, if the dynamic filter component determines the device class is not LPI only (e.g., the device class is SP only or LPI and SP capable), then the method 500 proceeds to block 512. At block 512, the dynamic filter component determines a target SP budget. In one embodiment, for indoor+integrated antennas, the dynamic filter component evaluates where client coverage requires these radios to operate at standard power. For the ones where LPI would suffice, the dynamic filter component may determine the center frequency for the bandpass filters using block 506.

At block 514, the dynamic filter component evaluates the AFC system response. For indoor APs that need the target SP budget or outdoor/external antenna units, the dynamic filter component sends AP location, hardware capabilities, antenna gain and other information to the AFC system and evaluates system response to determine the set of allowed channels and power budgets.

At block 516, the dynamic filter component evaluates a filter Q factor. For example, with dynamic filtering, the dynamic filter component may set the center frequency to lower than UNII-8 to make sure out of band transmission is not high (e.g., above a threshold).

At block 518, the dynamic filter component determines and sets the center frequency of each filter, based on one or more of the blocks 512, 514, and 516. In one embodiment, depending on the channel allowance from the AFC system and antenna type (e.g., internal versus external), the dynamic filter component can switch the filter center frequency and bandwidth. For example, if the AFC system does not permit standard power operation in a subset of UNII-5 or 7, channel 69 to 133, the dynamic filter component can set the filters' transition bands in any of these channels. Assuming the dynamic filter component employs a filter back, the dynamic filter component can choose non-contiguous bands for each radio while the filter cutting frequencies are aligned with the channels that do not have SPI permission. In another example, if SP operation is allowed in all AFC-controlled frequencies (UNII-5 and UNII-7), then the dynamic filter component can set the filter cutting frequencies to UNII-6 (where SP operation is not allowed). Similar to LPI only operation, the dynamic filter component can take AFC-related metrics into account, considering more constraints for outdoor usages with exclusion of Building Entry Loss (BEL). In addition to methods for indoor AP, the dynamic filter component can keep the edges on LPI-only channels that are not allowed to be used at all (e.g., UNII-6, 8).

At block 520, the dynamic filter component determines a multi-band configuration, based at least in part on channel availability and power budget between a plurality of bands. In some cases, certain computing devices may be configured as tri-band devices. For example, certain APs may be configured to operate on 2.4G/5G/5G/6G with dual radios on the 5 GHz band or 2.4G/5G/6G/6G with dual radios on the 6 GHz band. Despite the availability of larger bandwidths in 6 GHz and, the usage of dual radios on the 6 GHz band may not always be beneficial. For example, the feasibility of dual radios on the 6 GHz band may be based on parameters, such as the availability of channels that the AP can transmit with maximum power (e.g., standard power allowance by the AFC system).

Accordingly, in some embodiments, the dynamic filter component can optimize the use of additional radio(s) by determining the optimal usage in 5 GHz band versus 6 GHz band. For example, the dynamic filter component can evaluate the total number of channels allowed for the SP operation in 6 GHz vs frequencies that provide higher SiNR on 5 GHz spectrum. In this example, if the dynamic filter component determines that the total frequencies on 5 GHz yield better capacity, the dynamic filter component can roll back radio operations to 2/5/5/6 by enabling band-pass filter at the UNII-3 edge.

Additionally, the dynamic filter component can consider the power budget between 5 GHz and 6 GHz bands when determining the multi-band configuration. For example, if standard power is not available outdoor for part of or all of 6 GHz band, the dynamic filter component may determine the preferred configuration to be 2/5/5/6. The dynamic filter component can also consider the power budget of each band. For example, the dynamic filter component can select the radio which provides higher transmit power based on AFC inquiries, in order to take advantage of higher power transmissions to support higher modulation coding schemes (MCS)/data rates.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
   determining a device class associated with a computing device comprising a plurality of radios operating on a plurality of bands;
   determining one or more target operating parameters of the computing device, based at least in part on the device class;
   determining one or more filter parameters of a plurality of filters for operating the plurality of radios, based at least in part on the one or more target operating parameters; and
   configuring the plurality of radios according to the one or more filter parameters.

2. The computer-implemented method of claim 1, wherein the device class is one of the following types: (i) low power indoor (LPI)-only, standard power (SP)-only, and LPI and SP capable.

3. The computer-implemented method of claim 1, wherein determining the one or more target operating parameters comprises determining at least one of: (i) a target power budget for the computing device or (ii) a target back-off for each of the plurality of filters, when the device class is low power indoor (LPI)-only.

4. The computer-implemented method of claim 1, wherein determining the one or more filter parameters comprises determining a center frequency for each of the plurality of filters.

5. The computer-implemented method of claim 1, wherein determining the one or more target operating parameters comprises determining at least one of: (i) a target power budget for the computing device, (ii) a channel allowance, or (iii) a Q factor associated with each of the plurality of filters, when the device class is standard power (SP)-only or low power indoor (LPI)-only and SP capable.

6. The computer-implemented method of claim 5, wherein the target power budget and the channel allowance are based on input received from an automated frequency coordination (AFC) system.

7. The computer-implemented method of claim 1, further comprising:

determining a configuration of the plurality of bands for the plurality of radios; and configuring the plurality of radios according to the configuration.

8. The computer-implemented method of claim 7, wherein the configuration is determined based at least in part on a first number of channels allowed for standard power operation in a first band and a second number of channels allowed for standard power operation in a second band.

9. The computer-implemented method of claim 8, wherein the configuration is determined based at least in part on a power budget for each of a plurality of bands.

10. The computer-implemented method of claim 8, wherein:

the first band is 5 gigahertz (GHz) band; and the second band is 6 GHz band.

11. The computer-implemented method of claim 10, wherein the configuration comprises (i) dual radios operating on the 5 GHz band or (ii) dual radios operating on the 6 GHz band.

12. The computer-implemented method of claim 1, wherein:

the plurality of radios comprises four radios; and the plurality of bands comprises three bands.

13. The computer-implemented method of claim 12, wherein:

a first radio of the plurality of radios operates on a 2.4 gigahertz (GHz band);

a second radio of the plurality of radios operates on a 5 GHz band;

a third radio of the plurality of radios operates on the 5 GHz band; and a fourth radio of the plurality of radios operates on a 6 GHz band.

14. The computer-implemented method of claim 12, wherein:

a first radio of the plurality of radios operates on a 2.4 gigahertz (GHz band);

a second radio of the plurality of radios operates on a 5 GHz band;

a third radio of the plurality of radios operates on a 6 GHz band; and a fourth radio of the plurality of radios operates on the 6 GHz band.

15. A computing device, comprising:

a plurality of radios operating on a plurality of bands;

a memory; and a processor communicatively coupled to the memory, the processor being configured to perform an operation comprising:

determining a device class associated with the computing device;

determining one or more target operating parameters of the computing device, based at least in part on the device class;

determining one or more filter parameters of a plurality of filters for operating the plurality of radios, based at least in part on the one or more target operating parameters; and configuring the plurality of radios according to the one or more filter parameters.

16. The computing device of claim 15, wherein the device class is one of the following types: (i) low power indoor (LPI)-only, standard power (SP)-only, and LPI and SP capable.

17. The computing device of claim 15, wherein determining the one or more target operating parameters comprises determining at least one of: (i) a target power budget for the computing device or (ii) a target back-off for each of the plurality of filters, when the device class is low power indoor (LPI)-only.

18. The computing device of claim 15, wherein determining the one or more target operating parameters comprises determining at least one of: (i) a target power budget for the computing device, (ii) a channel allowance, or (iii) a Q factor associated with each of the plurality of filters, when the device class is standard power (SP)-only or low power indoor (LPI)-only and SP capable.

19. The computing device of claim 15, wherein determining the one or more filter parameters comprises determining a center frequency for each of the plurality of filters.

20. A non-transitory computer-readable storage medium comprising computer executable code, which when executed by one or more processors, performs an operation comprising:

determining a device class associated with a computing device comprising a plurality of radios operating on a plurality of bands;

determining one or more target operating parameters of the computing device, based at least in part on the device class;

determining one or more filter parameters of a plurality of filters for operating the plurality of radios, based at least in part on the one or more target operating parameters; and configuring the plurality of radios according to the one or more filter parameters.

* * * * *